(12) United States Patent
Fazakas

(10) Patent No.: US 6,479,969 B1
(45) Date of Patent: Nov. 12, 2002

(54) CIRCUIT ARRANGEMENT AND METHOD FOR PULSATED CHARGING OF BATTERIES

(76) Inventor: András Fazakas, H-1068, Budapest, Benczúr u. 39/b. Budapest (HU), 1068

( * ) Notice: Subject to any disclaimer, the term of this patent is extended or adjusted under 35 U.S.C. 154(b) by 0 days.

(21) Appl. No.: 10/031,104

(22) PCT Filed: Jul. 3, 2000

(86) PCT No.: PCT/HU00/00072

§ 371 (c)(1),
(2), (4) Date: Jan. 10, 2002

(87) PCT Pub. No.: WO01/06614

PCT Pub. Date: Jan. 25, 2001

(30) Foreign Application Priority Data

Jul. 15, 1999 (HU) .............................................. 9902383

(51) Int. Cl.[7] .............................. H02J 7/00; H02J 7/14
(52) U.S. Cl. ..................................................... 320/139
(58) Field of Search ................................. 320/139, 137, 320/145

(56) References Cited

U.S. PATENT DOCUMENTS

| | | |
|---|---|---|
| 4,878,007 A | 10/1989 | Gabor et al. |
| 5,270,635 A | 12/1993 | Hoffman et al. |
| 5,463,304 A | 10/1995 | Winters |
| 5,694,022 A | 12/1997 | Ranta et al. |

OTHER PUBLICATIONS

PCT/HU00/00072 International Search Report dated Dec. 19, 2000.

Primary Examiner—Gregory J. Toatley, Jr.
(74) Attorney, Agent, or Firm—Handal & Morofsky

(57) ABSTRACT

A circuit arrangement for pulsated charging of batteries that comprises: an alternating current source that has a predetermined inductance; a pair of bridge branches each comprising a parallel arrangement of a capacitor and a semiconductor switch element being preferably a diode or a thyristor, and the branches are connected to respective ones of the terminals of the source in such a way that the semiconductor elements in both branches are connected with similar electrodes to the associated one of the terminals; and a rectifier with alternative current terminals connected to the free ends of the bridge branches and with direct current terminals connected to the battery to be charged. A method for pulse charging batteries by using an alternating current source has also been provided which is characterized by the steps of modifying the increasing portions of the charging pulses by the addition of energy stored in reactive elements to increase in a larger extent relative to the rate of increase of said source and the decreasing portions to decrease more rapidly relative to the rate of decrease of the source.

14 Claims, 4 Drawing Sheets

CIRCUIT ARRANGEMENT AND METHOD FOR PULSATED CHARGING OF BATTERIES

The invention relates to a circuit arrangement and to a method for pulsated charging of batteries which scan be used practically to all kinds of batteries.

For charging batteries, especially in case of using cheaper charger circuits, a direct current voltage is used which has been rectified from the alternating current line voltage, and the direct current voltage is not smoothed, thus the charging current follows the pulsation of the rectified voltage. It is known that the charging with a pulsating current is not disadvantageous, when during the charging process certain limit values, characteristic to the actually used battery are not exceeded. The properties of the charging with a fluctuating and pulsating current have not been noticeably different from those at charging with smoothed direct current. Such a property is e.g. the cycle life of the battery, that corresponds to the number of charging and discharging cycles, within which the capacity of the battery does not decrease below a predetermined fraction of the initial capacity, for instance to 60%. Another important feature is the capacity expressed in ampere-hour units, which is initially high and decreases with the number of cycles. The cumulated capacity is not else than the extent of the whole energy delivered by the battery during the full cycle life. In addition to the above described battery characteristics, the battery cam also be characterized by the time required for attaining the fully charged state, the increase of temperature during the charging and discharging process, the peak value of the current that can be taken out of the battery, furthermore the appearance of the memory effect, finally the probability of accidental short circuits.

It is a generally accepted experience that the above listed individual properties cannot be improved without causing a worsening of one or more of the other parameters. When the charging time is decreased, the cycle life generally increases, the reliability decreases, and the capacity of the battery cannot be utilized either.

In conventional battery charger circuits the circuit portions that generate the charging current are very similar, they comprise a full wave rectifier connected to the secondary winding of a line transformer, and the direct current ports of the rectifier are connected to the battery terminals. The electronic circuits used in such chargers have the main task of monitoring the parameters of the batter during the charring process, on the basis of which the end moment of the charging is determined. In case of charging with a pulsating direct current, problems might rise if the internal resistance of the supply source is very low, because in such cases the difference between the almost constant battery voltage and the peak of the charging voltage might result in very high peaks in the charging current that the battery might not endure, or it is very difficult to adjust the optimum value of the charging current. The problem gets more difficult by the fact that during the charging process the battery voltage increases and the charging parameters cannot by adjusted accordingly. This problem is rarely apparent because the power supplies used in everyday practice have internal resistance values much higher than required, and the high internal resistance prevents the formation of high charging current peaks. This property is favorable from the aspect that it suppresses the above problem, but at the same time it is disadvantageous because the battery will not charged by current and voltage values that were otherwise required for obtaining an ideal charging. This will manifest itself by the longer charging time, by the appearance of the memory effect and by the decrease of life time, thus by the less favorable values of the battery parameters compared to the values determined theoretically by the battery design.

In U.S. Pat. No. 4,878,007 a pulse charging for nickel-cadmium batteries has been suggested, wherein respective short discharging sections were inserted between subsequent charging pulses. This charging method resulted in an increased activity in the internal chemical processes of the battery, and as a result the memory effect decreased, moreover the batteries with previously decreased capacity could be regenerated. In the practice the suggested way of charging has not proven much better than available charging methods, since the use of the steep charging pulses decreased the life time of the batteries, furthermore it was difficult to realize the required charging-discharging cycles.

U.S. Pat. No. 5,463,304 describes a life extending circuit for storage batteries that comprises a capacitor connected in series with the primary winding of the line transformer of an AC source tuned to form a resonant circuit with the inductance of the primary winding. This circuit provided some extension of the life cycle of the batteries, but it could not substantially influence the process of charging, since the DC level at the secondary winding of the circuit has remained unchanged, and the properties of the charging current (especially the peak value) were limited by the limiting properties of the transformer and the associated circuitry.

If one wishes to obtain a substantial improvement in the charging of batteries compared to conventional methods, if that objective can be attained at all, the processes that takes place in the battery should be studied more carefully, because on the basis of such studies one might draw conclusions that show the way towards obtaining better parameters.

In the book of Dr. Hevesi, Imre. "Elektromosságtan" (in English: Theory of Electricity) published by Nemzeti Tank önyvkiadó, Budapest, 1998, on pages 428–429 the movement of ions in electrolytes is described. It is stated that ions have finite velocity of displacement which gets stabilized following a voltage has been applied, and the velocity is directly proportional with the intensity of the established field. The velocity depends also on the charge of the ions and a friction coefficient a that act against the movement of the ions.

The primary objective of the present invention is to provide a charging method and a circuit arrangement implementing the method that can provide more favorable charging conditions, and as a result of which the battery parameters will significantly improve compared to conventional charging methods.

For attaining this objective and based on the above cited literature, it has been supposed that the chemical reaction at the close vicinity of the electrodes will take best place in a time period when the ions from the other electrode have not yet arrived and their presence cannot disturb the processes taking place in this electrode region. This condition prevails at the initial period of the establishment of the electrical field, and when the formation of a balanced state of the ions at the electrode region is prohibited for short time periods.

For this purpose and based on this supposition a circuit arrangement as claimed in claim 1 to 11 has been provided.

According to a further aspect of the invention a method has been provided for pulse charging batteries by using an alternating current source, which method is defined in claims 12 to 14.

The invention will now be described in connection with preferable embodiments thereof, in which reference will be made to the accompanying drawings. In the drawing.

Figures 1A, 1B, 1C:
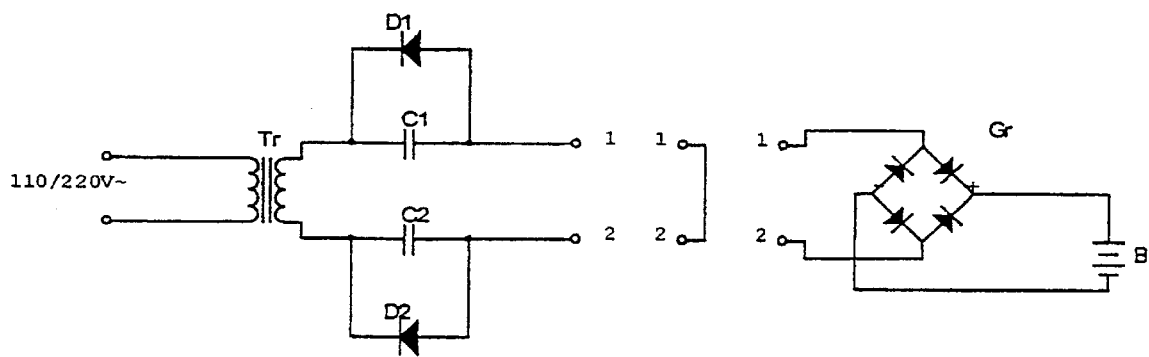
FIG. 1c shows the schematic circuit diagram of the basic circuit of the invention.
FIGS. 1a and 1b are explanation sketches.

The circuit of FIG. 1c shows a pair of diodes D1 and D2 coupled to secondary winding of line transformer Tr, and capacitors C1 and C2 connected in parallel with the diodes, realized by high quality and high capacitance electrolyte capacitors (100 to 200 $\mu$F). Output terminals 1 and 2 of the circuit are connected normally to fill wave rectifier Gr arranged in Graetz circuit shown in FIG. 1b, that have direct current terminals connected to the battery B to be charged. The knowledge of the operation of this circuit has an indispensable role in understanding the circuit arrangement of the invention FIG. 1a shows a situation when the output terminals 1 and 2 are shorted. In that case one can see at a glance that no direct current can flow through the secondary winding of the transformer Tr, since the diodes D1 and D2 are connected against each other, and one of them is always in off state. The capacitors represent for a DC point of view an open circuit. From this it follows that in this basic circuit even an accidental short circuit of the battery B coupled to output terminals 1 and 2 through the rectifier Gr cannot cause harm to the transformer Tr which will then be loaded by a fully reactive load.

In actual use the basic circuit of FIG. 1c is complemented by the rectifier shown in FIG. 1b and with the battery B that has a voltage $U_B$. At the secondary winding of the transformer Tr the effective voltage $U_S$ of the sine alternating voltage might be equal to the voltage $U_S$ or it can be slightly (by about 20–30%) higher, therefore the peak of the alternating voltage will be at least by 40% sigher. If the initial state is examined when the circuit stores no energy, the capacitors C1 and C2 sore no charge. If the voltage has been switched on at its zero crossing, then initially no current will flow, and this state will be true until the momentary value of the voltage $U_o$ reached the threshold value of $U_o=U_B+3U_D$, where $U_D$ designate the forward voltage of the diodes being typically 6V in case of silicon type diodes. Current will flow through two diodes of the rectifier Gr and through the one of diodes D1 and D2 which has a forward direction equal to the momentary direction of flow of the current. Let us assume that this is initially the diode D2.

Figure 2:
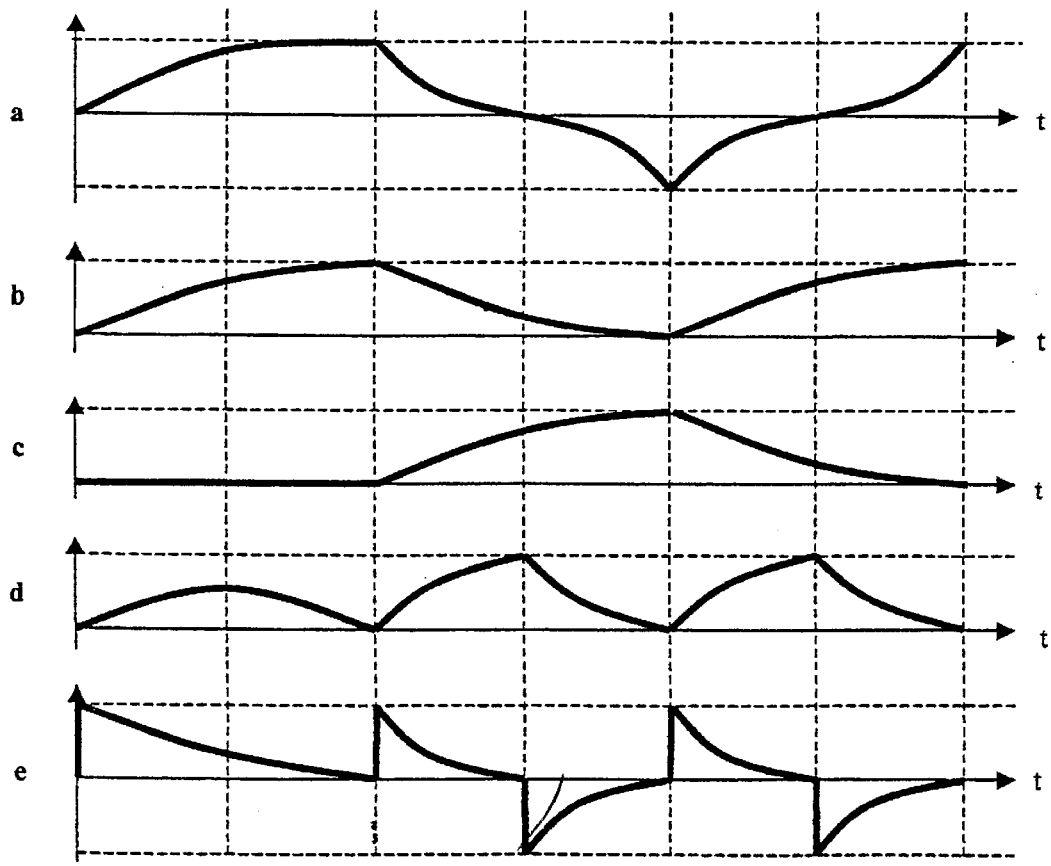
FIG. 2 shows time diagrams at important points of FIG. 1.

After the above condition has been met the alternating current will commence to charge the capacitor C1, and its charging current charges the battery B. In view of the high capacity of the capacitor C1 and of the fact that the voltage of the battery B is constant and it has a very low internal resistance, furthermore the voltage difference between the two arms of the capacitor C1 increases, the current will start to flow with a steep increase and the capacitor C1 will be charged. When the alternative voltage reaches its peak value, the voltage on the capacitor C1 will be equal to the difference between the peak value and of the above referred threshold value. Now the current starts to decrease but will not stop flowing, because the inductance of the secondary winding will be energized due to the effect of the high current to a value of $I^2L$ and this energy further increases the voltage of the capacitor C1. During the decrease of the alternating voltage the sum of $U_o+U_{C1}$ will be reached and at this time the flow of current will stop and the capacitor C1 retains its voltage. Later the alternative voltage changes its sign but due to the full wave rectification the current that flows through the battery B will retain its charging direction although a reversal takes place at the AC side of the circuit. The relationships will now be more complex, since the capacitor C2 will also be charged and at the calculation of the threshold voltage the voltage $U_{C2}$ has to be taken into account, too. Following a few number of periods a balance state will be reached, and the voltages of the two capacitors will cyclically and steeply change, the current $I_B$ will increase suddenly in both half periods thereafter its increase slows down and approaches asymptotically to a maximum, after the maximum it will decrease suddenly and the decrease slows down and approaches the zero value. When viewed from below the increasing section is convex and the decreasing section is concave, as it can be observed in the time diagrams of FIG. 2, where the diagrams a, b, c, d and e show the values; $U_{1-2}$, $U_{C1}$, $U_{C2}$, $I_{CH}$ and $dI/dt$, respectively. The change of the current is well illustrated by the shape of its differential quotient show on FIG. 2e that is the second differential quotient of the movement of the charges. This differential quotient changes its sign at the end of each asymptotic section of the current curve and has a sudden jump thereafter. Such a current curve shape has an outstanding significance m charging batteries, sine the sudden charging front represented by the increasing section is followed by a more steeply decreasing section. Previously reference was made to the supposition that at the battery electrodes the chemical reaction takes place under optimum circumstances only at the initial section of the movements of the ions, and this requires the use or steeply changing and disappearing charging currents. The simple circuit shown makes sure that the change of current be that steep at which the second differential quotient of the change (first differential of the current) takes periodically a zero value then it suddenly jumps and changes sign. This property carries perhaps the most significant advantage of the present invention, since it creates ideal circumstances for the electrochemical processes that take place in the battery.

Figure 3:
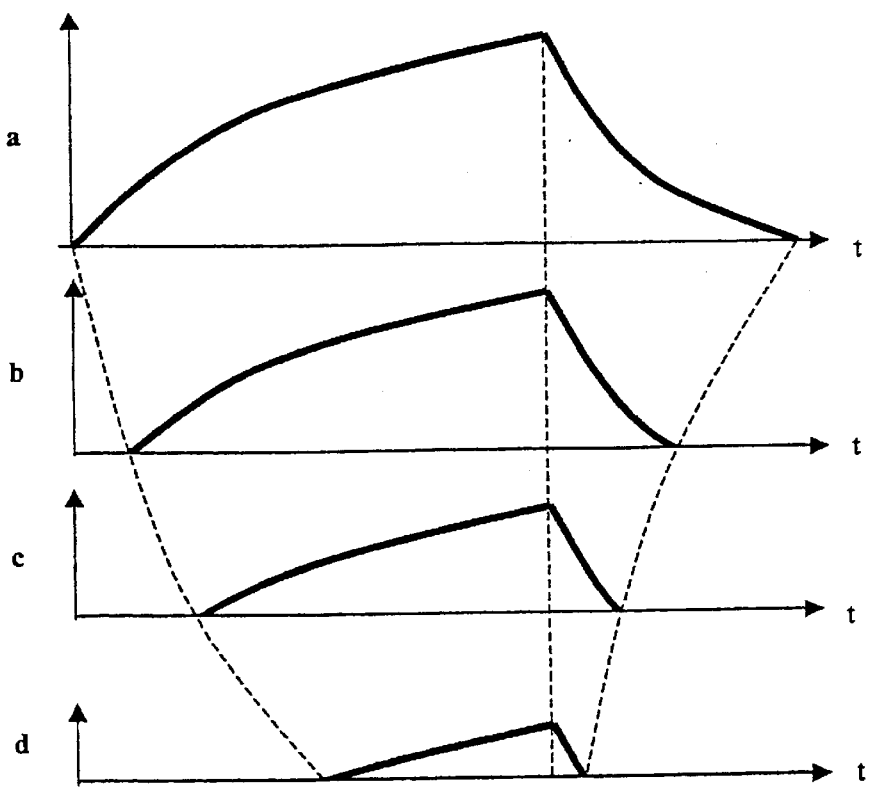
FIG. 3 shows the change of a current pulse in case of increasing battery voltage.

In the process described here the significant changes of the charging current of the battery are the sum of the effects of the presence of the inductance of the secondary winding and of the capacitance of the capacitors C1 and C2. This process is very sensitive against the voltage of the battery. Initially, when the voltage of the battery is still low, the difference between the peak of the alternative voltage and of the battery voltage is high, and this differences drives the large current that will store energy in the secondary winding according to a square power function, and this energy pushes the process forward following the moment when according to a static point of view the process should have had an end. During the charging process the battery voltage increases, and this difference will become smaller, and as a result of this the current, although it retains its shape, will change with gradually smaller amplitudes. This is illustrated by the diagrams of FIG. 3, which show the shape of the current below each other at always higher battery voltages. The flowing angle of the current and the transported amount of charges (that is determined by the area below the curve) will steeply decrease with the increase of the battery voltage. This phenomenon is very favorable, because partially or almost fully charged batteries require substantially lower charging current as at the beginning of the charging process. The time curve of the current will, however, retain its shape through the whole process.

It is a substantial practical advantage that the invention is not sensitive against the frequency of the alternating voltage, and in case of applications where no line voltage with a frequency of 50 or 60 Hz is not available, but it is much hiker (as in case of generators of vehicles), it remains in operation, and the steepness of the changes will be still higher. In such cases the capacitors and the inductance of the winding connected in series therewith should be dimensioned in accordance with the higher frequency.

A further substantial advantage lies in the simplicity of the circuit, because in the charging main circuit where very high currents flow, any other conventional adjustment of the current shape would be difficult to be made and would require the use of large and expensive components.

In case of the basic circuit according to the invention there are numerous ways of adjusting the shape of the charging current and of changing the charging parameters (like charging voltage, chug current). In the following a few examples will be shown.

Figure 4:
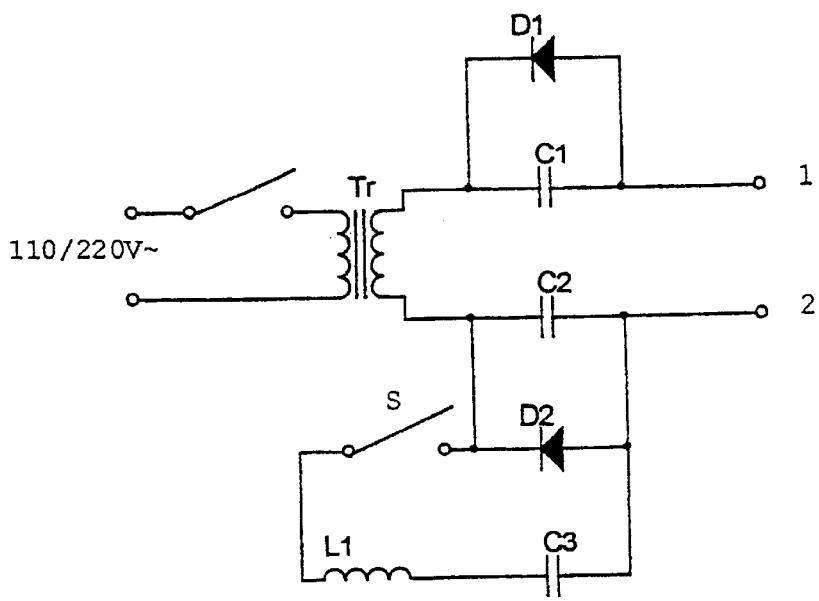
FIG. 4 shows an exemplary way of changing the charging power.

In FIG. 4 the circuit differs from the one of FIG. 1c in that in one branch a switch S is used for inserting a capacitor C3 and a series inductance L1. By closing the switch S a higher current can be reached that changes more steeply. When the Etch S is closed both the charging current and the charging voltage will age.

Figure 5:
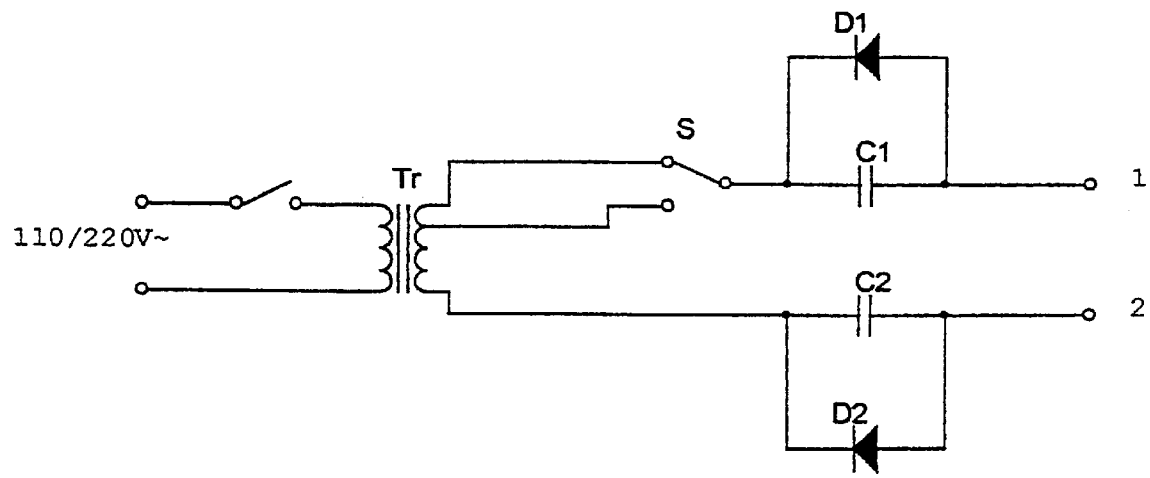
FIG. 5 shows a further way for the same purpose.

In the circuit of FIG. 5 the secondary winding of the transformer Tr has a plurality of tap point and the adjustment lies in the selection of the most appropriate size of the winding. This circuit will be preferable mainly if the charging current has to remain substantially the same and the adjustment of the voltage is required.

Figure 6:
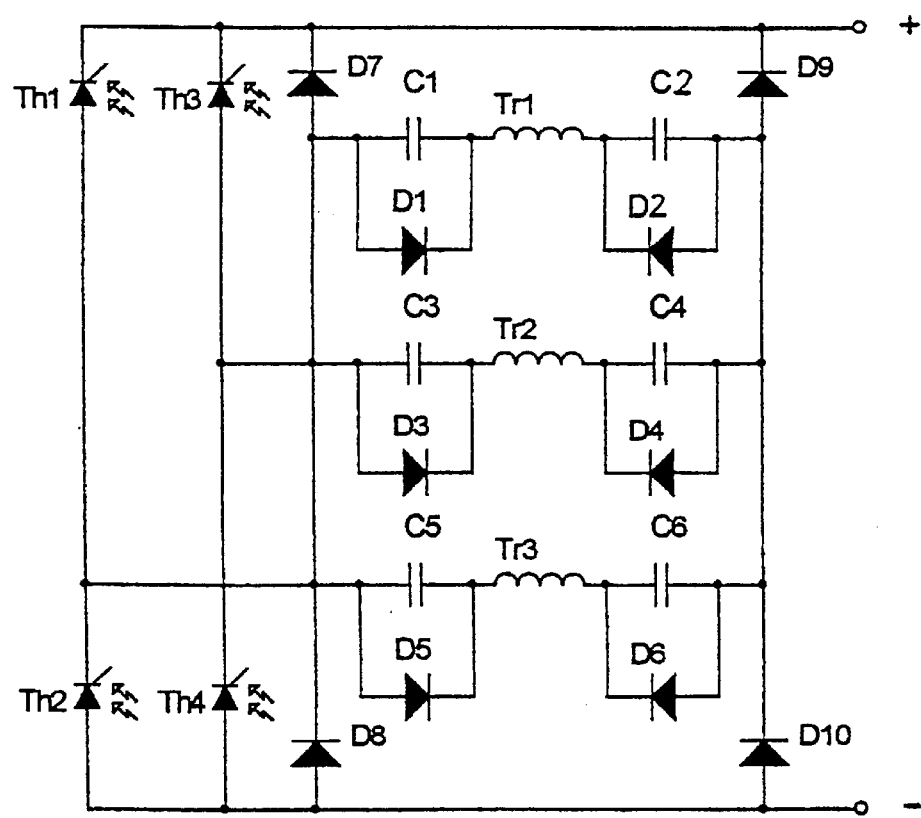
FIG. 6 shows an alternative possibility of changing the charging power.

In the circuit of FIG. 6 a plurality of independent transformers or a single larger transformer are (is) used that has a plurality of secondary windings with identical voltages and phases. Each one of the illustrated three secondary winding is connected to a respective one of bridge branch that has a diode and a capacitor as described in FIG. 1c. Only one of them is coupled permanently to the rectifier. The two other similar circuits can be connected to the load when thyristors Th1 to Th4 are fired at appropriate moments. One bridge branch of the rectifiers is common, and the other bridge branches are constituted by the controlled thyristors themselves. By such a circuit arrangement the value of the current can be changed by retaining a constant charging voltage.

Figure 7:
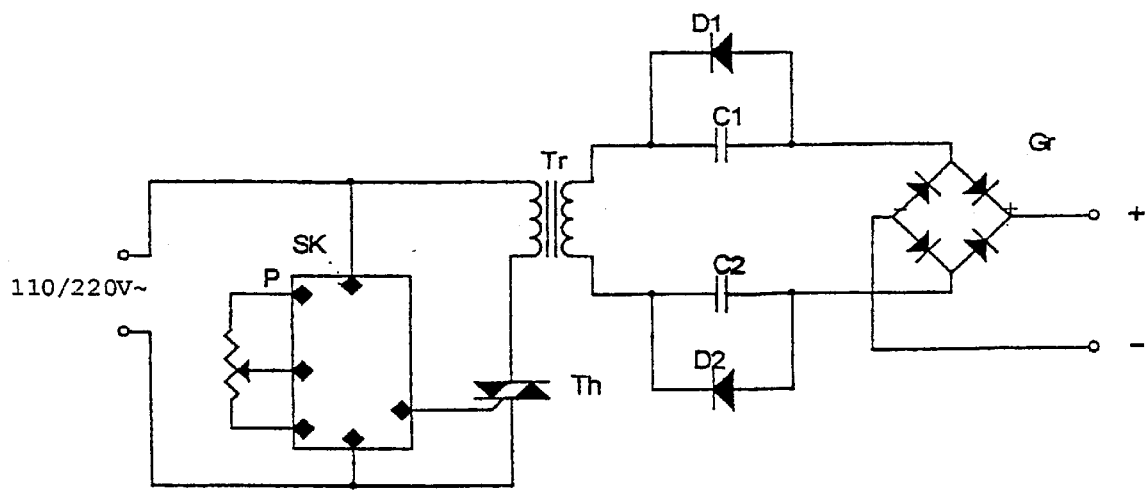
FIG. 7 shows the principle of the phase splitting power control.

A further possibly is shown in FIG. 7, in which the primary wending of the transformer Tr is connected through a power control unit SK. This unit is made preferably according to my HU patent 210 725 that relates to a switch and power control unit, that passes through from the alternating line voltage only a section that corresponds to a range of flowing angles. In a given range the flowing angle continuously increases or decreases, or according to its setting the flowing angle can also take a constant value. The changing of the flowing angle changes the effective value of the charging energy. By this control unit a very fine adjustment can be attained.

By the above adjustments that intervene before the rectifier have created ways of adjusting the main parameters of the charging. By adjusting the shape of the charging current pules the most appropriate charging conditions can be adjusted for any given battery type. A few examples of changing the shape of the current pulses will now be shown.

Figure 8:
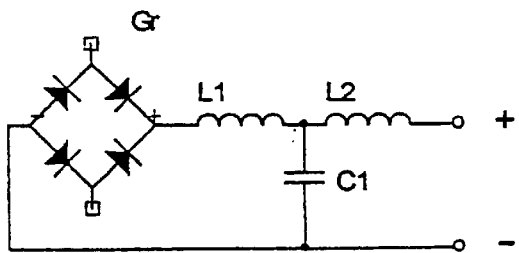
FIG. 8 shows a way of changing the shape of the charging pulses.

FIG. 8 shows an LC filter arranged as a low pass filter connected between the output of the rectifier Gr and the battery B to be charged, which can be used to flatten the steep section and to decrease the steepness of the decreasing sections of the current pulses.

Figure 9:
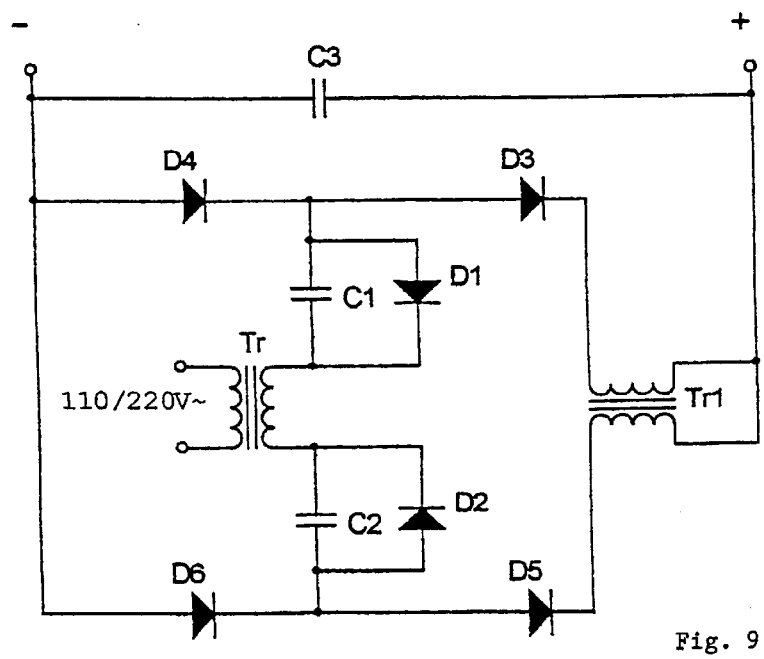
FIG. 9 shows a further way of changing the shape of the charging pulses.

Similar but more expressive effects will have the circuit shown in FIG. 9 comprising a transformer and a capacitor with high capacitance.

The result of a long series of experiments carried out by the invention has verified that it can well be used with all kinds of generally accepted types of rechargeable batteries, i.e. favorable results were obtained in case of nickel-cadmium batteries, with lead acid batteries used in motor cars, or with lithium and nickel-metal hybrid batteries. The advantages manifested themselves in the shorter charging times, in the increased cycle life, in the stabilized value of the capacity during the life time (i.e. the slighter decrease of capacity with increasing cycle numbers), in the disappearence of the memory effect, in the slighter degree of warming up and in the favorable change of numerous further battery parameters. These results are remarkable because in known earlier charging methods any property of a battery could be improved only on the expense of one or more other properties. The advantages that appear in the simultaneous improvements of all these parameters seem to verify the hypotetic theory outlined.

What is claimed is:

1. Circuit arrangement for pulsated charging of batteries, comprising:
    an alternating current source having a predetermined inductance and a pair of output terminals;
    a rectifier (Gr) with alternative current terminals and direct current terminals, said direct current terminals being connected to the battery (B) to be charged;
    characterized by comprising a pair of bridge branches each comprising a parallel arrangement of a capacitor (C1, C2) and a semiconductor switch (D1, D2), said bridge branches being respectively connected between said output terminals of the alternating current source and the alternating current terminals of said rectifier (Gr) in such a way that said semiconductor switches (D1, D2) in both branches being connected with similar electrodes to the associated terminal.

2. The circuit arrangement as claimed in claim 1, wherein said rectifier (Gr) being a fill wave rectifier.

3. The circuit arrangement as claimed in claim 1, wherein said alternating current source comprising a transformer (Tr) having a primary and a secondary winding, and said output terminals being constituted by the terminals of said secondary winding, and wherein said inductance being dominantly constituted by said secondary winding.

4. The circuit arrangement as claimed in claim 1, further comprising LC elements (L1, C3) forming filter circuits.

5. The circuit arrangement as claimed in claim 1, comprising a controlled power controller (Th1, Th2, Th3, Th4) connected in series with the alternating source and allowing passage only of a partial range from each full period of the alternating current, and the size of this partial range when expressed in angle units being the flowing angle, and the power controller is adapted to change the flowing angle and thereby the charging power for the battery (B) within predetermined limits.

6. The circuit arrangement as claimed in claim 1, comprising at least one further capacitor (C3), and a switch (S), whereby said further capacitor (C3) can be connected in parallel with the capacitor (C2) in one of said bridge branches.

7. The circuit arrangement as claimed in claim 6, wherein the capacitance values of the capacitors (C1, C2) in said bridge branches differ front each other at most by 200%.

8. The circuit arrangement as claimed in claim 3, wherein said transformer (Tr) has a winding with a plurality of tap points of which at least one being selectable by a switch to adjust thereby the properties of said charging power.

9. The circuit arrangement as claimed in claim 1, comprising a plurality of pairs of bridge branches dimensioned substantially to identical voltage, and said pairs being connectable in parallel for the sake of adjustment of the charging power.

10. The circuit arrangement as claimed in claim 1, wherein said semiconductor switches being diodes.

11. The circuit arrangement as claimed in claim 1, wherein said alternating current source having an adjustable frequency.

12. A method for pulse charging of batteries by periodic direct current pulses generated by the circuit arrangement as claimed in claim 1, wherein each charging pulse consisting of a rising section and a subsequent decreasing section, characterized in that in said increasing sections or each charging pulse adding energy stored in reactive elements of the circuit arrangement, whereby said rising sections having the highest rate of increase at the beginning of each rising section followed by a continuously decreasing rate of increase till the end of the rising section, and in said decreasing sections of each charging pulse removing energy by means of said reactive elements, whereby said decreasing sections having the highest rate of decrease at the beginning of each decreasing section followed by a continuously decreasing rate till the end of the decreasing section.

13. The method as claimed in claim 12, wherein the differential quotient of the generated periodically repeated charging current takes a zero or near zero value twice in each of said periods, whereafter it changes its sign and has a substantial jump.

14. The method as claimed in claim 12, comprising the steps of examining the battery type prior to tie actual charging and establishing those charging voltage and current limit values that still do not cause harm to the battery, and during the actual charging process keeping the actual current and voltage values within the established limits.

* * * * *